United States Patent [19]
Harasin et al.

[11] Patent Number: 5,300,560
[45] Date of Patent: Apr. 5, 1994

[54] SLOWER REACTING RIM SYSTEMS BASED UPON ALIPHATIC AMINE TERMINATED POLYETHERS

[75] Inventors: Stephen J. Harasin, Morgan; Renee M. Hunkele, Allison Park, both of Pa.

[73] Assignee: Miles Inc., Pittsburgh, Pa.

[21] Appl. No.: 36,570

[22] Filed: Mar. 24, 1993

Related U.S. Application Data

[63] Continuation-in-part of Ser. No. 733,551, Jul. 22, 1991, abandoned.

[51] Int. Cl.$^5$ .............. C08K 5/20; C08G 18/50; C08L 75/02; C08L 75/08
[52] U.S. Cl. .............. 524/724; 521/51; 521/159; 521/163; 524/714; 524/773; 524/874; 528/52; 528/53; 528/60; 528/61; 528/76; 528/77; 264/45.1; 264/51; 264/300; 264/328.6
[58] Field of Search .............. 521/159, 163, 51; 524/714, 724, 773, 874; 528/52, 53, 60, 61, 76, 77; 264/45.1, 51, 300, 328.6

[56] References Cited

U.S. PATENT DOCUMENTS

| | | | |
|---|---|---|---|
| 3,726,952 | 4/1973 | Boden et al. | 264/48 |
| 4,269,945 | 5/1981 | Vanderhider et al. | 521/159 |
| 4,396,729 | 8/1983 | Dominguez et al. | 521/51 |
| 4,433,067 | 2/1984 | Rice et al. | 521/51 |
| 4,444,910 | 4/1984 | Rice et al. | 521/51 |
| 4,530,941 | 7/1985 | Turner et al. | 521/176 |
| 4,794,129 | 12/1988 | Gillis, Jr. et al. | 521/121 |
| 4,845,133 | 7/1989 | Priester, Jr. et al. | 521/167 |
| 4,919,878 | 4/1990 | Pilger et al. | 264/300 |
| 5,106,935 | 4/1992 | Grigsby, Jr. et al. | 528/59 |

*Primary Examiner*—John Kight, III
*Assistant Examiner*—Rabon Sergent
*Attorney, Agent, or Firm*—Joseph C. Gil; N. Denise Brown

[57] ABSTRACT

The present invention is directed to the discovery that certain additives of the type described in U.S. Pat. No. 3,726,952 effectively slow down the reaction rate of certain RIM systems based upon aliphatic amine terminated polyethers.

6 Claims, No Drawings

SLOWER REACTING RIM SYSTEMS BASED UPON ALIPHATIC AMINE TERMINATED POLYETHERS

This is a Continuation-in-Part of U.S. application Ser. No. 07/733, 551 filed on Jul. 22, 1991 now abandoned.

BACKGROUND OF THE INVENTION

RIM (i.e., reaction injection molding) systems are known which are based upon aliphatic amine terminated polyethers. Typical of such systems are those described in U.S. Pat. Nos. 4,396,729, 4,433,067, 4,444,910 and 4,530,941. The amine terminated polyethers are relatively high molecular weight materials. U.S. Pat. No. 4,269,945 describes a RIM process wherein a relatively high molecular weight polyol, a chain extender, and a polyisocyanate are used. The chain extender is a relatively low molecular weight aliphatic amine. For many RIM applications, the aliphatic amine terminated polyether systems react too rapidly.

Additives containing at least 25 aliphatic carbon atoms and which are salts of an aliphatic carboxylic acid with an amine containing amide groups, with the amine containing amide groups being the reaction product of an aliphatic carboxylic acid and a di- or polyamine such that the amine contains at least one free primary, secondary, or tertiary amino group, are known. See, U.S. Pat. No. 3,726,952. These additives are described as being mold release agents for use in the production of integral skin polyurethane foams. The additives are described as being used in amounts of from about 0.1 to about 15% by weight, and preferably from about 0.5 to about 2% by weight, based on the total weight of the foamable reaction mixture. Active hydrogen-containing compounds described in U.S. Pat. No. 3,726,952 include polyamines, and addition products of alkylene oxides with aminoalcohols or amines. However, the reference fails to recognize or address the problems associated with producing foams with systems containing amine-based compounds, i.e. that the amine-based compounds react too quickly under normal processing conditions.

DESCRIPTION OF THE INVENTION

The present invention is directed to the discovery that certain additives of the type described in U.S. Pat. No. 3,726,952 effectively slow down the reaction rate of certain RIM systems based upon aliphatic amine terminated polyethers. More particularly, the present invention is directed to an improved process for producing a molded product by reacting a reaction mixture in a closed mold. The improvement resides in using a reaction mixture comprising:

A) an organic polyisocyanate having an isocyanate group content of from about 15 to about 40% by weight, preferably from about 25 to about 35% by weight, and most preferably from about 27 to about 33% by weight, B) one or more organic hydroxyl group containing compounds having molecular weights of from about 100 to about 6000 and having hydroxyl functionalities of from 2 to 4, preferably from 3 to 4, C) one or more aliphatic amine terminated polyethers having molecular weights of from about 1400 to about 5000, and having amine functionalities of from 2 to 6, preferably from 3 to 6, and D) from more than 3 to about 9% by weight, preferably from about 4 to about 9% by weight, and most preferably from about 4 to about 6% by weight, based upon the combined weight of components B) and C) of an additive containing at least 25 aliphatic carbon atoms, said additive being a salt of an aliphatic carboxylic acid with an amine containing amide groups, said amine containing amide groups being the reaction product of an aliphatic carboxylic acid and a di- or polyamine such that the amine contains at least one free primary, secondary, or tertiary amino group, with the weight ratio of component B) to component C) being from about 0.6:1 to about 1.5:1, and wherein the isocyanate index is from about 100 to about 150. It is possible to use more than 9% by weight of additive D) based upon the combined weights of components B) and C), such as, for example, 12% by weight. However, there is no substantial improvement in slowing down the reaction rate when using 12% by weight vs. 9% by weight of additive D). In fact, as the amount of additive D) increases, physical properties may deteriorate.

Suitable polyisocyanates for use in the present invention are aliphatic, cycloaliphatic, araliphatic, aromatic and heterocyclic polyisocyanates which are known and described for example by W. Siefken in Justus Liebigs Annalen der Chemie, 562, pages 75–136. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures thereof, 1-isocyanato-3,3,5-trimethyl-5-isocyanatomethylcyclohexane (isophorone diisocyanate or IPDI), 2,4- and 2,6-hexahydrotoluylene diisocyanate and mixtures thereof, hexahydro-1,3- and/or -1,4-phenylene diisocyanate, perhydro-2,4'- and/or 4,4'-diphenyl methane diisocyanate, 1,3- and 1,4-phenylene diisocyanate, 2,4- and 2,6-toluene diisocyanate and mixtures thereof, diphenyl methane 2,4'- and/or 4,4'-diisocyanate, naphthylene 1,5-diisocyanate, triphenyl methane-4, 4', 4'-triisocyanate and polyphenyl polymethylene polyisocyanates of the type obtained by condensing aniline with fomaldehyde, followed by condensation.

It is preferred to use the readily available polyisocyanates such as 2,4- and 2,6-toluene diisocyanate and mixtures of these isomers, polyphenyl polymethylene polyisocyanates of the type obtained by condensing aniline with formaldehyde, followed by phosgenation, and polyisocyanates containing carbodiimide groups, urethane groups, allophanate groups, isocyanurate groups, urea groups or bioret groups. Particularly preferred are the liquid derivatives of 4,4'-diphenyl methane diisocyanate (MDI) which may be liquefied inter alia by introducing carbodiimide groups, blending with 2,4'-diphenyl methane diisocyanate or by introducing urethane groups. Especially preferred are the liquefied derivatives of MDI prepared by reacting MDI with 0.1 to 0.3 mols of a polypropylene glycol having a molecular weight of up to about 700, in particular, dipropylene glycol, tripropylene glycol or mixtures thereof as disclosed, for example, in U.S. Pat. No. 3,644,457.

Also suitable for use as the polyisocyanate component are isocyanate-terminated prepolymers based on the above-mentioned polyisocyanates and the isocyanate-reactive compounds, preferably hydroxyl compounds, disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Also necessary for the present invention are one or more organic hydroxyl group containing compounds having molecular weights of from about 100 to about 6000 and having hydroxyl functionalities of from 2 to 4 and preferably 3 to 4. These compounds include both high molecular weight compounds having molecular weights of from 400 to about 6000 as well as low molecular weight compounds having molecular weights of from 100 to 399. Examples of suitable compounds include the polyesters, polyethers, polythioethers, polyacetals and polycarbonates containing from 2 to 4 hydroxyl groups of the type known for the production of polyurethanes. Suitable polyethers for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York., London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

Also necessary to the present invention are aliphatic amine terminated polyethers having molecular weights of from about 1400 to about 5000, and having amine functionalities of from 2 to 6 and preferably from 3 to 6. These amines are known in the art and are described in U.S. Pat. Nos. 4,396,729, 4,433,067, 4,444,910, and 4,530,941, the disclosures of which are herein incorporated by reference. Suitable aminopolyethers which may be used in accordance with the present invention are those wherein at least about 30 and preferably about 60 to 100% equivalent of the isocyanate-reactive groups are primary and/or secondary (preferably primary) aliphatically bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (Belgian patent 634,741). U.S. Pat. No. 3,654,370 describes the production of polyoxyalkylene polyamines by reaction of the corresponding polyol with ammonia and hydrogen in the presence of a nickel, copper, chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and French Patent 1,551,605. The production of polyethers containing terminal secondary amino groups is described, for example, in French Patent 1,466,708.

The "aminopolyethers" used in accordance with the invention are often mixtures of the compounds mentioned by way of example and (on a statistical average) most preferably contain 3 to 4 terminal isocyanate-reactive groups. In the process according to the invention, the "aminopolyethers" may be used in admixture with polyhydroxypolyethers free from amino groups.

The key to the present invention resides in the use of the additive which slows down the reactivity of the aliphatic amines. The additives useful herein contain at least 25 aliphatic carbon atoms, said additive being a salt of an aliphatic carboxylic acid with an amine containing amide groups, said amine containing amide groups being the reaction product of an aliphatic carboxylic acid and a di- or polyamine such that the amine contains at least one free primary, secondary, or tertiary amino group. These additives are known and are described in U.S. Pat. No. 3,726,952, the disclosure of which is herein incorporated by reference.

Other additives which may be used in the present invention include catalysts, especially tin(II) salts of carboxylic acids, dialkyl tin salts of carboxylic acids, dialkyl tin mercaptides, dialkyl tin dithioesters and tertiary amines. +referred among these catalysts are dibutyl tin dilaurate and 1,4-diaza-bicyclo-(2,2,2)-octane (triethylene diamine), especially mixtures of these catalysts. The catalysts are generally used in amounts of about 0.01 to 10%, preferably about 0.05 to 2%, based on the weight of the high molecular weight component.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxyethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The compositions according to the present invention may be molded using conventional processing techniques and are especially suited for processing by the RIM process. In general, two separate streams are intimately mixed and subsequently injected into a suitable mold, although it is possible to use more than two streams. The first stream contains the polyisocyanate component, while the second stream contains all the other ingredients.

The invention is further illustrated but is not intended to be limited by the following examples in which all parts and percentages are by weight unless otherwise specified.

EXAMPLES

In the examples, the following materials were used:

POLYOL A: a glycerin/propylene oxide adduct having an OH number of about 1050 and a molecular weight of about 160.

T-5000: an approximately 5000 molecular weight trifunctional primary aliphatic amine terminated polyether, commercially available from Texaco as Jeffamine T-5000.

DC-193: a commercially available silicone surfactant from Dow Corning as DC-193.

PL-8: Polycat 8, N,N-dimethylcyclohexyl amine, available from Air Products.

DBT: dibutyltin dilaurate.

AB-19: a commercially available phosphonate ester from Albright & Wilson as Antiblaze 19.

R-11: monochlorotrifluoromethane.

ISO: a 50/50 mixture of i) Mondur MR, a commercial polymethylenepoly(phenyl isocyanate) containing about 48% by weight of diisocyanate and having an isocyanate group content of about 32% by weight, available from Mobay Corporation and ii) Mondur PF, a liquid isocyanate prepared by reacting 4,4'-methylenebis(phenyl isocyanate) with tripropylene glycol in a molar ratio of about 5:1, commercially available from Mobay Corporation, with the mixture having an isocyanate group content of about 27% by weight.

ADT: the salt of tall oil fatty acid with an aminoamide obtained by reacting i) one mole of tall oil fatty acid with ii) two moles of N,N-dimethyl-propylene-diamine.

POLYOL B: a glycerin/propylene oxide/ethylene oxide adduct (weight ratio of PO to EO of about 83 to 17) having a molecular weight of about 6000 and a primary OH content of 88%.

In the examples, the parts by weight of the ISO shown in the Table were added to the parts by weight of the Bside shown in the Table and the resultant mixture was vigorously mixed for seven seconds. About 200 parts of the mixture were then poured into a tarred one quart container. The cream times, gel times and tack free times were then measured. The formulations used and the results obtained were as set forth in the following table, with the various reaction times reported as an average of three runs for each example:

TABLE I

| | Examples | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| B-side | | | | | | | | | | | | | | | | |
| POLYOL A | 55 | 55 | 55 | 55 | 55 | 55 | 55 | 55 | 55 | 55 | 55 | 55 | 55 | 55 | 55 | 55 |
| T-5000 | 45 | 45 | 45 | 45 | 45 | 45 | 45 | 45 | 45 | — | — | 45 | 45 | 45 | 45 | 45 |
| POLYOL B | — | — | — | — | — | — | — | — | — | 45 | 45 | — | — | — | — | — |
| ADT | 6 | 6 | 6 | 6 | — | 6 | 3 | 9 | 12 | — | 6 | — | 4 | 5 | 6 | 9 |
| DC-193 | 3 | 3 | 3 | 3 | 3 | 3 | 3 | 3 | 3 | 3 | 3 | 3 | 3 | 3 | 3 | 3 |
| PC-8 | 1 | — | .3 | .7 | 1 | 1 | 1 | 1 | 1 | 1 | 1 | 1 | 1 | 1 | 1 | 1 |
| DBT | .2 | — | .1 | .1 | .2 | .2 | .2 | .2 | .2 | .2 | .2 | .2 | .2 | .2 | .2 | .2 |
| AB-19 | 19 | 19 | 19 | 19 | 19 | 19 | 19 | 19 | 19 | 19 | 19 | 19 | 19 | 19 | 19 | 19 |
| WATER | .1 | .1 | .1 | .1 | .1 | .1 | .1 | .1 | .1 | .1 | .1 | .1 | .1 | .1 | .1 | .1 |
| R-11 | 4 | 4 | 4 | 4 | 4 | 4 | 4 | 4 | 4 | 4 | 4 | 4 | 4 | 4 | 4 | 4 |
| WEIGHT RATIO | | | | | | | | | | | | | | | | |
| ISO TO B-SIDE | 140/100 | →  | → | → | 143/100 | 140/100 | → | → | → | → | → | 143/100 | 140/100 | → | → | → |

TABLE II

| REACTIVITY DATA (neat) | Examples | | | | | | | | | | | | | | | |
|---|---|---|---|---|---|---|---|---|---|---|---|---|---|---|---|---|
| Reaction Times, seconds | 1 | 2 | 3 | 4 | 5 | 6 | 7 | 8 | 9 | 10 | 11 | 12 | 13 | 14 | 15 | 16 |
| Cream | 18 | 96 | 57 | 27 | * | 18 | * | 20 | 23 | 12 | 22 | * | 9 | 13 | 19 | 20 |

TABLE II-continued

| REACTIVITY DATA (neat) | Examples | | | | | | | | | | | | | | | |
|---|---|---|---|---|---|---|---|---|---|---|---|---|---|---|---|---|
| Reaction Times, seconds | 1 | 2 | 3 | 4 | 5 | 6 | 7 | 8 | 9 | 10 | 11 | 12 | 13 | 14 | 15 | 16 |
| Gel | 32 | 128 | 76 | 45 | * | 33 | * | 37 | 39 | 15 | 37 | 8 | 10 | 20 | 29 | 35 |
| Tack-free | 50 | 162 | 100 | 66 | * | 48 | * | 54 | 54 | 17 | 43 | * | 13 | 23 | 40 | 50 |

*too reactive to determine

TABLE III

| REACTIVITY DATA (solution) | Examples | | | | | | | | | | | | | | | |
|---|---|---|---|---|---|---|---|---|---|---|---|---|---|---|---|---|
| Reaction Times, seconds | 1 | 2 | 3 | 4 | 5 | 6 | 7 | 8 | 9 | 10 | 11 | 12 | 13 | 14 | 15 | 16 |
| Cream** | — | — | — | — | — | — | — | — | — | — | — | * | 56 | 57 | 58 | 60 |
| Gel** | — | — | — | — | — | — | — | — | — | — | — | * | 73 | 78 | 83 | 89 |
| Tack-free** | — | — | — | — | — | — | — | — | — | — | — | * | 135 | 144 | 147 | 150 |

*too reactive to determine
**no solution data was determined for Examples 1-11

Cream Time, seconds: The elapsed time between initiation of mixing the isocyanate and B-side until the mixture turns from brown to cream color or until the liquid mass begins to rise in the container.

Gel (or, string) Time, seconds: The elapsed time between initiation of mixing the isocyanate and B-side until that time when the polymer forms a string when a wood applicator stick is immersed into the foaming mass and then withdrawn.

Tack Free Time, seconds: The elapsed time between initiation of mixing the isocyanate and Bside until that time when the surface of the foam is no longer tacky to the touch of the finger or the edge of a tongue depressor.

The solution method used in Table III was developed to handle systems having very fast reactivities. In the solution method, samples are prepared by diluting the Bside of the material (described in Table I) with 25% by weight of Mesamoll, an alkylsulfonic acid ester of phenol. Mesomall is a non-reactive diluent, and other such non-reactive materials could also be used for this purpose. The prescribed amount of isocyanate is then added based on this dilution, and the sample is mixed vigorously for 7 seconds. Approximately 150 parts of the mixture are poured into a quart container and the cream, gel, and tack-free times are measured.

In the tables, Examples 5, 7, 9, 10, 11, and 12 are comparative examples.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a molded product by reacting a reaction mixture in a closed mold, the improvement wherein said reaction mixture comprises:

A) an organic polyisocyanate having an isocyanate group content of from about 15 to about 40% by weight, B) one or more organic hydroxyl group containing compounds having molecular weights of from about 100 to about 6000 and having hydroxyl functionalities of from 2 to 4, C) one or more aliphatic amine terminated polyethers having molecular weights of from about 1400 to about 5000, and having amine functionalities of from 2 to 6, and D) from more than 3 to about 9% by weight based upon the combined weight of components B) and C) of an additive containing at least 25 aliphatic carbon atoms, said additive being a salt of an aliphatic carboxylic acid with an amine containing amide groups, said amine containing amide groups being the reaction product of an aliphatic carboxylic acid and a di- or polyamine such that the amine contains at least one free primary, secondary, or tertiary amino group, with the weight ratio of component B) to component C) being from about 0.6:1 to about 1.5:1, and wherein the isocyanate index is from about 1.0 to about 1.5.

2. The process of claim 1 wherein said polyisocyanate has an isocyanate group content of from about 25 to about 35% by weight.

3. The process of claim 1, wherein component B) has a hydroxyl functionality of from 3 to 4, and component C) has an amine functionality of from 3 to 6.

4. The process of claim 3 wherein said polyisocyanate has an isocyanate group content of from about 27 to about 33% by weight.

5. The process of claim 1, wherein said additive containing at least 25 aliphatic carbon atoms is used in an amount of from 4 to 9% by weight based on the combined weight of components B) and C).

6. The process of claim 5, wherein said compound is used in an amount of from 4 to 6% by weight, based on the combined weight of component B) and C).

* * * * *